W. B. BARCUS.
LOAF FORMING MACHINE.
APPLICATION FILED OCT. 13, 1913.
1,114,572.
Patented Oct. 20, 1914.
4 SHEETS—SHEET 1.
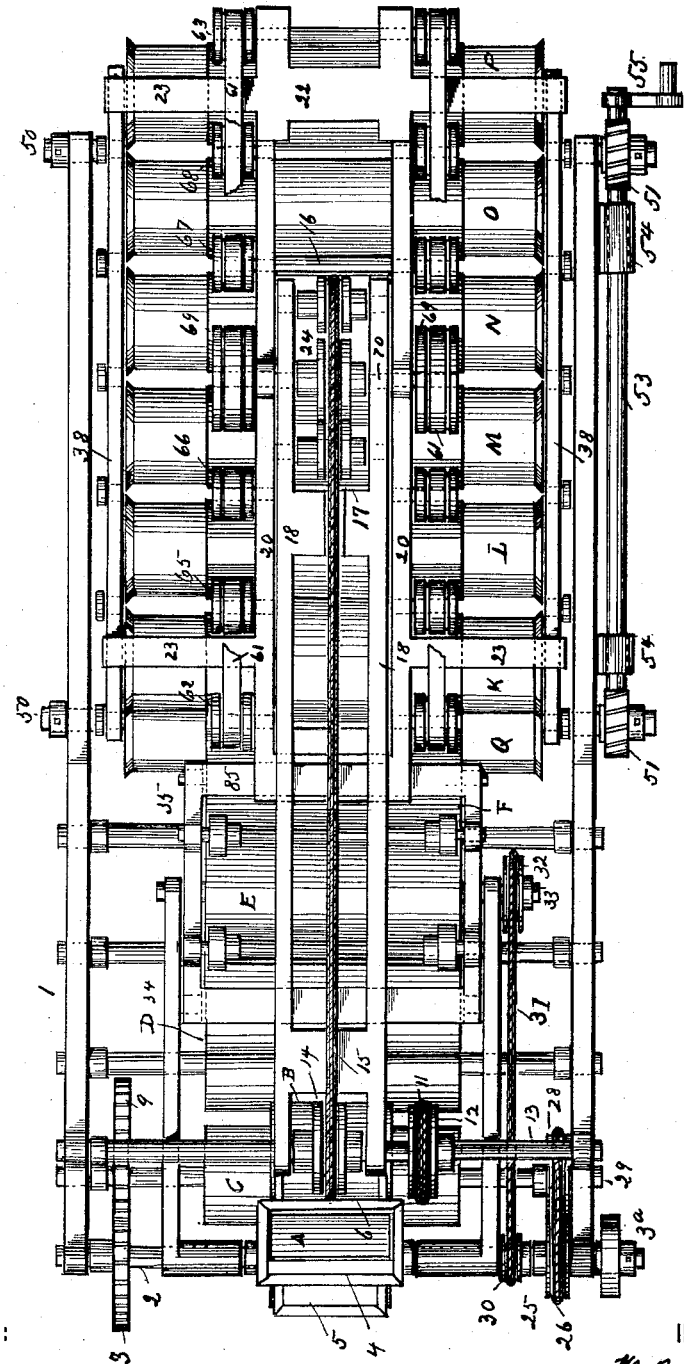
WITNESSES:
M. Shaw
H. Gill
INVENTOR
W. B. Barcus
BY Sean F Gunn
his ATTORNEY.

W. B. BARCUS.
LOAF FORMING MACHINE.
APPLICATION FILED OCT. 13, 1913.
1,114,572.
Patented Oct. 20, 1914.
4 SHEETS—SHEET 2.
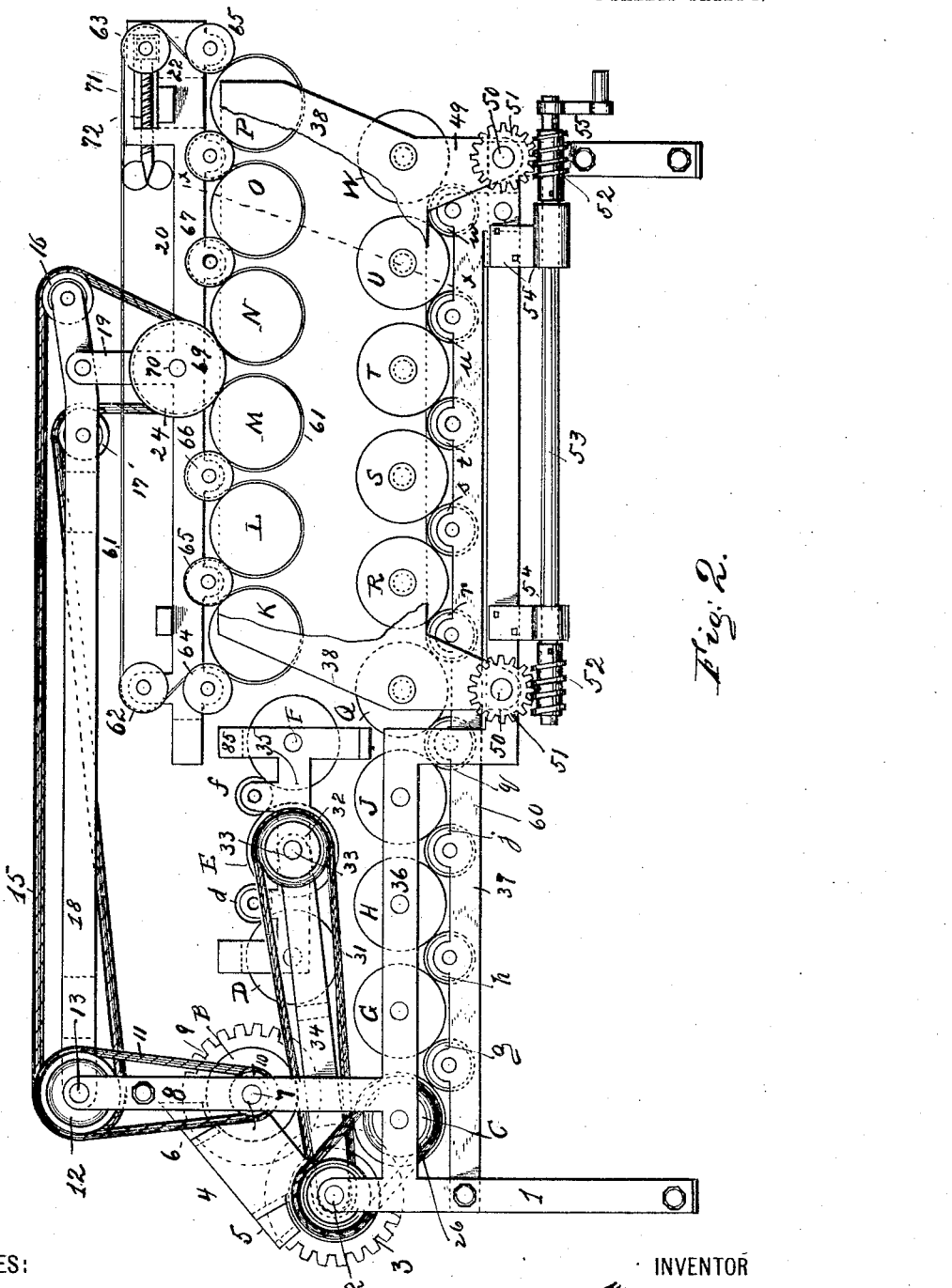
WITNESSES:
M. Shaw
H. Gill
INVENTOR
W. B. Barcus
BY Oscar F. Gunz
his ATTORNEY.

W. B. BARCUS.
LOAF FORMING MACHINE.
APPLICATION FILED OCT. 13, 1913.

1,114,572.

Patented Oct. 20, 1914.
4 SHEETS—SHEET 3.

WITNESSES:
M. Shaw.
H. Gill

INVENTOR
W. B. Barcus
BY Oscar F. Gunn
his ATTORNEY.

W. B. BARCUS.
LOAF FORMING MACHINE.
APPLICATION FILED OCT. 13, 1913.
1,114,572.
Patented Oct. 20, 1914.
4 SHEETS—SHEET 4.
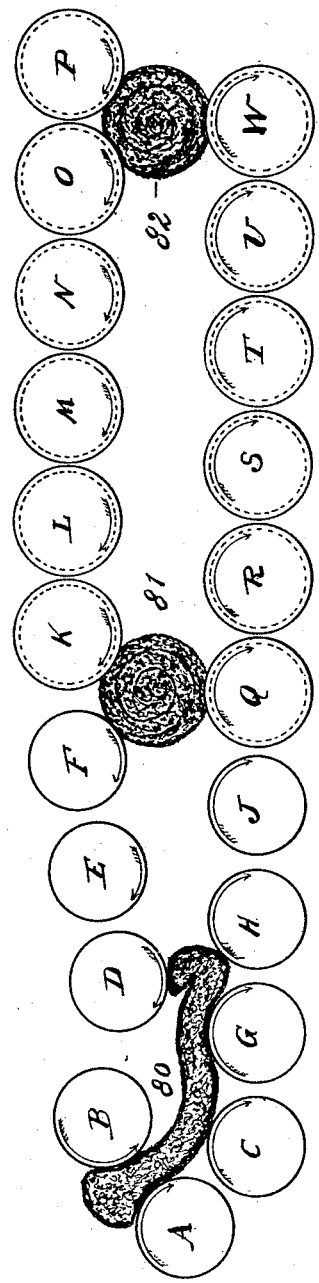
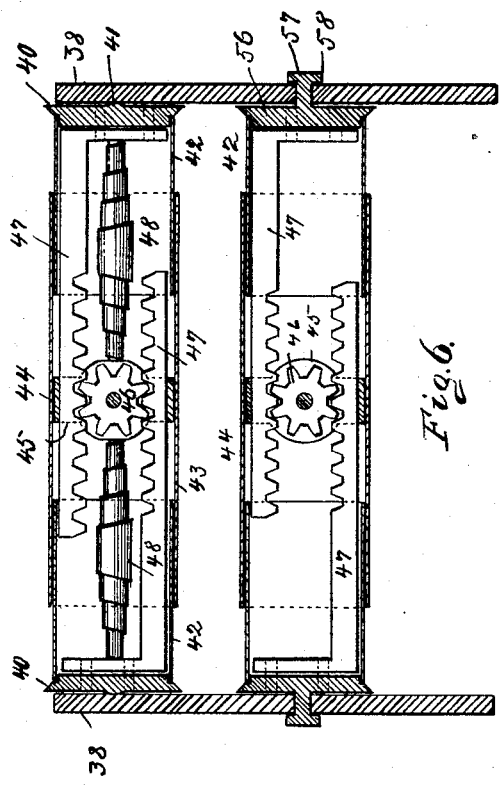
WITNESSES:
M. Shaw.
H. Pill.
INVENTOR
W. B. Barcus
BY
his ATTORNEY.
THE NORRIS PETERS CO., PHOTO-LITHO., WASHINGTON, D. C.

UNITED STATES PATENT OFFICE.

WILLIAM B. BARCUS, OF NEWARK, NEW JERSEY.

LOAF-FORMING MACHINE.

1,114,572. Specification of Letters Patent. Patented Oct. 20, 1914.

Application filed October 13, 1913. Serial No. 794,755.

*To all whom it may concern:*

Be it known that I, WILLIAM B. BARCUS, a citizen of the United States, and a resident of Newark, in the county of Essex and State of New Jersey, have invented certain new and useful Improvements in Loaf-Forming Machines, of which the following is a specification.

This invention relates to certain new and useful improvements in loaf forming machines which are used for the purpose of shaping a batch of dough into a loaf.

The object of my invention is to provide a new and improved machine of this kind which is simple in construction, strong, effective in use and rapidly converts a batch of dough into a perfectly molded and shaped loaf ready for the oven.

Figure 4:
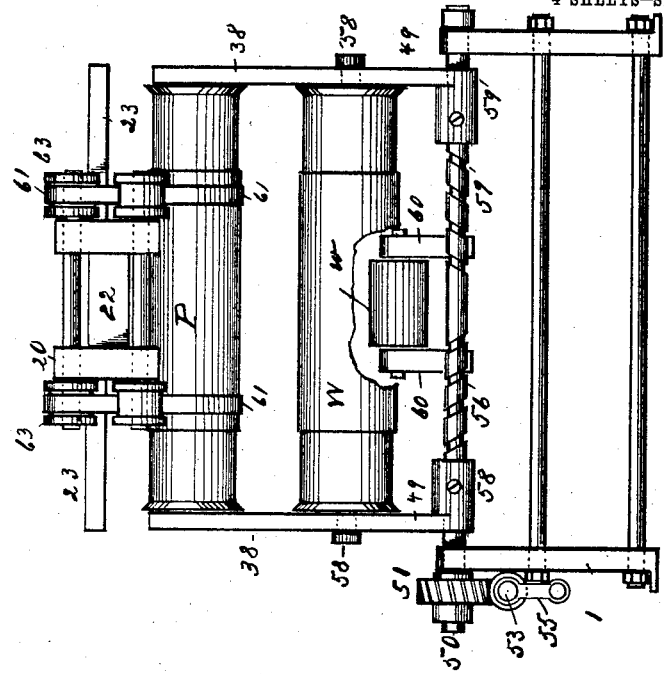
Figure 3:
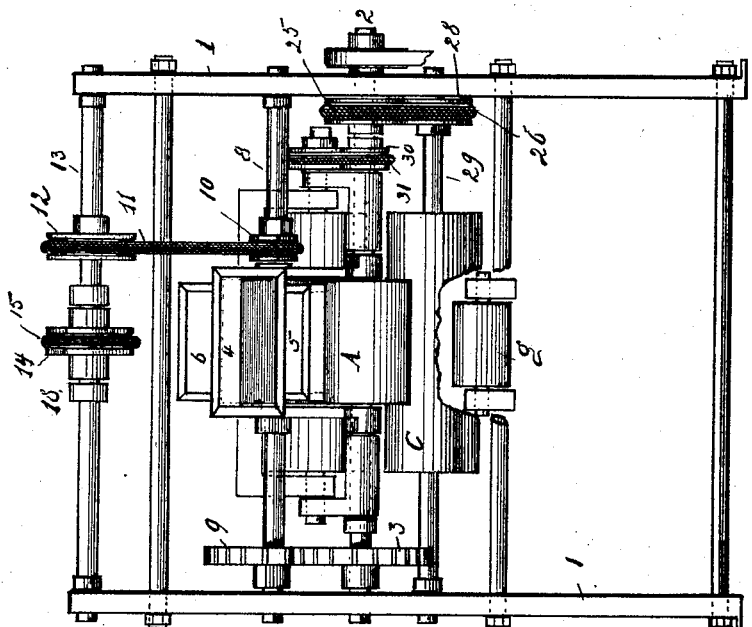

In the accompanying drawings in which like letters of reference indicate like parts in all the figures:—Figure 1 is a plan view of my improved loaf forming machine, parts being broken away. Fig. 2 is a side view, parts being broken away. Fig. 3 is a front end view, parts being broken away. Fig. 4 is a rear end view, parts being broken away. Fig. 5 is a diagrammatic view showing the relation of the several rollers and showing the sheeted dough and the loaf formed from the same, in section in various positions. Fig. 6 is a vertical transverse sectional view through the loaf forming rollers and the side plates between which they are mounted, on the line $x$—$x$ of Fig. 2.

The entire mechanism is mounted in two longitudinal upright side frames 1 which support all the several parts. At the front end of the machine, that is at the end at which the batch of dough is introduced, a main drive shaft 2 is mounted in the side frames 1 and this shaft carries a cog wheel 3 and a belt pulley 3ᵃ which is driven from a suitable source of power. On this shaft is also mounted a feed roller A, the length of which roller is equal to about ¼ the distance between the side frames and which roller is mounted centrally between the side frames. Above this roller A a hopper 4 is mounted into which hopper the batch of dough is fed. A flour compartment 5 is formed at the lower end of the hopper 4 and is directly above the roller A and at the top of the hopper 4 another flour compartment 6 is formed which is directly above the roller B, between which rollers A and B the batch of dough passes from the hopper, to be sheeted. The roller B is mounted upon a shaft 7 between two uprights 8 of the machine frame, which shaft 7 carries a cog wheel 9 engaging the cog wheel 3. The shaft 7 also carries a grooved pulley 10 over which an endless belt or rope 11 passes which rope or belt also passes over a grooved pulley 12 fixed on a shaft 13 mounted in the top of the standards 8 of the main frames. On this shaft 13 there is also fixed a grooved pulley 14 over which an endless belt or rope 15 passes which also passes over two pulleys 16 and 17 mounted between two bars 18 extending lengthwise of the frame and supported at the front ends by the shaft 13 which passes loosely through said side bars 18 and at the rear ends by standards 19 on two side bars 20 of the frame 22 having laterally projecting arms 23. The endless belt or rope 15 passes under a grooved pulley 24 mounted in the frame 22. The main shaft 2 also carries a grooved pulley 25 over which an endless belt 26 passes which also passes over a grooved pulley 28 on a shaft 29 mounted in the main frame 1 and carrying a roller C which is adjacent to and about twice the length of the roller A and partially below and partially to the rear of the same as shown in Figs. 1 and 3. The shaft 2 also carries a grooved pulley 30 around which an endless belt 31 passes which is also passed around a grooved pulley 32 fixed on a shaft 33 mounted at its ends in two side bars 34, the front ends of which are mounted to rock on the main shaft 2. On said shaft 33 a frame 35 is mounted centrally and in said frame three rollers D, E and F are loosely mounted as are also the supplemental friction drive roller $d$ between and above the large rollers D and E and the friction roller $f$ between and above the friction rollers E and F so that the rollers D and F are driven from the central roller E frictionally by means of the friction rollers $d$ and $f$, said rollers E and F and the friction rollers $d$ and $f$ all being mounted in the frame 35 so that they are mounted to move together. As the said frame 35 is supported centrally by the shaft 33 of the central roller E, the front roller D and the rear roller F can swing up and down, the front rollers swinging down when the rear roller F swings up and vice versa.

In a horizontal member 36 of each side frame 1 three rollers G, H and J are mounted parallel with each other and beneath the frame 35 and these three rollers D, E and F and the rollers G, H and J are all of the same length and parallel. Between the rollers C and G and the rollers G and H and the rollers H and J the three friction rollers $g$, $h$ and $j$ respectively are mounted between the bars 60 of the main frame and are in frictional contact with the rollers C, G, H and J and as the roller C is driven positively by the endless belt 29 from the main shaft, the rollers G, H and J are driven frictionally from the roller C by means of said friction rollers $g$, $h$ and $j$.

Between two side plates 38 in the main frame a series of six rollers (more or less) K, L, M, N, O and P are mounted loosely that is to say, they do not have any end journals but the plates 38 extend almost up to the top of the ends of the said rollers. These drums or rollers K, L, M, N, O and P are all constructed alike and I will describe only one of them by referring to Fig. 6 which shows the roller O in longitudinal section. Each roller is provided at each end with a head 40 having a central boss 41 on the outer side which boss rests loosely on the inner face of the side plate 38. To each head 40 a cylindrical section 42 is secured and the two sections 42 can telescope into a central tubular section 43 which is secured to a ring 44 having a cross piece 45 on a stud of which a cog wheel 46 is loosely mounted and engages two opposite racks 47 projecting through the cylindrical sections 42 from the heads 40. Between each head 40 and the central frame 45 a volute spring 48 is held by studs passing from the inner sides of the head 40 and from the side edges of the cross piece 45 into the open ends of the volute spring. When the two side plates 38 are pressed toward each other the volute springs 48 are compressed and the cylindrical sections 42 telescope into the central cylindrical section 43 and the racks 47 and pinions or cog wheel 46 keep the parts properly centered and related. When the plates 38 are moved apart to lengthen the said rollers the expanding volute springs move the outer two telescoping sections outward. Each side plate 38 is provided at each end at the bottom with a wing 49 in which wings two transverse shafts 50 are mounted. At the sides of the main frame these shafts pass through the main frame and on one projecting end is fixed a worm wheel 51 which worm wheels engage the worms on the ends of the horizontal shaft 53 suspended from the main frame by sleeve brackets 54. A crank handle 55 is provided on said shaft 53 at the rear end of the machine. The shafts 50 are provided with a right and left hand screw thread 56 and 57 which pass through correspondingly threaded sleeves 58 and 59 in the bottom parts of the side plates 38 so that by turning said crank handle 55 the side plates 38 can be moved toward each other for the purpose of shortening the rollers or from each other for the purpose of lengthening them. Between the said side plates 38 and beneath the rollers K, L, M, N, O and P six rollers, Q, R, S, T, U and W are mounted in the said side plates 38 and these rollers are all alike and of these rollers the roller Q is shown in longitudinal section in Fig. 6. They are constructed like those of the upper tier of rollers with the exception that each end head 56 has a pivot 57 mounted in a side plate 38 and having a head 58 on the outer end of the pivot so that the telescoping sections are compelled to move with the side plates 38. The racks 47, the pinion 46, the central cross piece 45 and the telescoping and central sections are all present as described above. Between the rollers Q, R, S, T, U and W a series of friction rollers $q$, $r$, $s$, $t$, $u$ and $w$ are mounted in the longitudinal bars 60 of the main frame and contact with said rollers Q, R, S, T, U and W as shown in Figs. 2, 3 and 4. The roller Q is in contact with the friction roller $q$ which is also in contact with the roller $j$, see Fig. 2. The rollers K, L, M, N, O and P are suspended from two endless bands 61 preferably made of sheet steel, which bands pass over the pulleys 62 and 63 on the frame 22, over the pulleys 64 and 65 directly beneath the pulleys 62 and 63 and alternately under the rollers K, L, M, N, O and P and over the pulleys 65, 66, 67 and 68 and also over pulleys 69 which are fastened on the ends of the shaft 70 in the frame 22. Bearing blocks for the pulleys 69 are adjustable in the slot 71 of the frame 22 and can be adjusted by a screw 72 to tighten the belts 61. The side plates 38 are moved a greater or less distance from or toward each other and the rollers K, L, M, N, O, P, Q, R, S, T, U and W between said side plates are lengthened or shortened in the manner previously described according to the desired length of the loaf. The directions of rotation of the several rollers are indicated by the arrows in Fig. 5. It will be seen that the upper tier of rollers D, E, F, K, L, M, N, O and P all rotate in the same direction which is the same direction of rotation of the lower tier rollers A, C, G, H, J, Q, R, S, T, U and W. The first upper roller B which is a feed roller, rotates in the inverse direction of all the other rollers. It will be observed that the pulleys 10 and 30 on the shaft 2 and 7 respectively are smaller than the pulleys on the shafts 12 and 33 respectively, whereas the pulley 25 on the shaft 2 and the pulley 28 on the shaft 29 are of the same size so that thereby all the rollers of the upper tier except the first roller B are rotated at about half the speed of the rollers of the lower tier.

The operation is as follows:—The dough from the hopper passes between the rollers A and B and is converted into a sheet 80 which is supported and carried forward by the first two lower rollers C and G and then its inner end encounters the roller D which turns the end of the sheet in the direction toward the front end of the machine and as the lower surface of the dough rests upon rollers which at their top turn in the direction from the front to the rear end of the machine and the upper surface of the dough encounters the bottom parts of the upper rollers which bottom parts move in the direction from the rear to the front of the machine and as the lower rollers move with almost double the speed of the upper rollers, the mass of dough designated by 81 and 82 in its different positions is moved in a direction from the front to the rear end of the machine, but while being so moved it is pressed and kneaded by the upper rollers into a substantially helical form, the convolutions of which however, are pressed firmly together. At the same time the batch of dough is lengthened until its end contacts with the side plates and it is thus converted into a spirally wound loaf which is uniformly kneaded and shaped and smoothed on its surface by the rollers and emerges from between the rear end rollers P and W. When the rolled loaf is acted upon by the roller F of the group of three rollers G, E and F in the swinging frame 35 its diameter is so great as to tend to raise the roller F as shown in Fig. 5 whereby the front roller D of this group of three rollers D, E and F is forced downward and thus brought into the path of the fixed sheet of dough so as to curl or turn the inner end of said dough sheet.

It will be observed that the rollers of the upper tier with the exception of the feed roller can yield, for example, the three rollers D, E and F can swing upward together with the frame supporting them and can swing on the frame and likewise the frame 22 in which the upper rollers K, L, M, N, O and P are mounted can swing upward with said frame so that when a thicker loaf is passed through the machine the upper rollers can yield to permit the passage of such loaf. Likewise when the frame 35 is raised by a passing loaf its upwardly projecting part 85 strikes against the forward end of the frame 22 and lifts it and all the rollers in said frame to form a larger passage way for the loaf.

Having described my invention what I claim as new and desire to secure by Letters Patent is:—

1. In a loaf forming machine, the combination with a pair of feed rollers rotating in opposite directions, of a tier of upper and a tier of lower rollers, some of which rollers of the upper and the lower tier are constructed to be shortened or lengthened, said extensible rollers being located in the rear part of the machine and means for rotating said rollers, substantially as set forth.

2. In a loaf forming machine, the combination with a pair of feed rollers rotating in opposite directions, of a tier of upper and a tier of lower rollers, some of which rollers of the upper and the lower tier are constructed to be shortened or lengthened and means for rotating said rollers and means for shortening or lengthening all the extensible rollers at the same time, said extensible rollers being mounted in the rear part of the machine, substantially as set forth.

3. In a loaf forming machine, the combination with a pair of feed rollers, an upper and lower tier of rollers for molding the dough passing between them, a group of these rollers of the upper and the lower tier being extensible, said extensible rollers being mounted in the rear part of the machine, a movable frame carrying a series of rollers of the upper tier between the upper feed roller and the first extensible roller of the upper tier, substantially as set forth.

4. In a loaf forming machine, the combination with a tier of upper rollers and a tier of lower rollers, of a pair of feed rollers, one of which pertains to the upper tier and the other to the lower tier, means for rotating all the rollers of the upper tier except the upper feed roller at less speed than the speed of the rollers of the lower tier, substantially as set forth.

5. In a loaf forming machine, the combination with an upper and a lower tier of rollers between which the dough to be molded into a loaf is to be passed, a pair of feed rollers, a series of extensible rollers in each tier, the extensible rollers being located in the rear part of the machine, a frame in which the three rollers in the upper tier between the upper feed roller and the first extensible roller are mounted, a driven shaft on which the intermediate one of said three rollers is mounted, said frame being mounted to rock on the shaft of the said intermediate roller of said three rollers, substantially as set forth.

6. In a loaf forming machine, the combination with an upper and a lower tier of rollers between which the dough to be molded into a loaf is to be passed, a pair of feed rollers, a series of extensible rollers in each tier, the extensible rollers being located in the rear part of the machine, a frame in which the three rollers in the upper tier between the upper feed roller and the first extensible roller are mounted, a driven shaft on which the intermediate one of said three rollers is mounted, said frame being mounted to rock on the shaft of the said intermediate roller of said three rollers, and friction rollers on said frame for driving the end rollers on said frame from the central roller, substantially as set forth.

7. In a loaf forming machine, the combination with an upper and a lower tier of rollers between which the dough to be molded into a loaf is to be passed, a pair of feed rollers, a series of extensible rollers in each tier, the extensible rollers being mounted in the rear part of the machine, a frame in which the three rollers in the upper tier between the upper feed roller and the first extensible roller are mounted, a driven shaft on which the intermediate one of said three rollers is mounted, said frame being mounted to rock on the shaft of the intermediate roller of said three rollers, friction rollers on said frame for driving the end rollers on said frame from the central roller and means for driving the shaft of the central roller from the main shaft in the main frame of said machine, substantially as set forth.

8. In a loaf forming machine, the combination with a frame, of a driving shaft, an upper tier of rollers and a lower tier of rollers mounted in said frame, a pair of feed rollers, gearing for driving the feed rollers at the same speed and in opposite directions, means for rotating the first three rollers of the upper tier beyond the upper feed roller, from the main shaft independent of the means for driving the other rollers, means for driving the remaining rollers of the upper tier from the main shaft and means for driving the rollers of the lower tier from the main shaft, which means serve to rotate all the rollers of the upper tier except the upper feed roller at a slower speed than the rollers of the lower tier, substantially as set forth.

9. In a loaf forming machine, the combination with a main frame, of two vertical laterally movable plates in the same, means for moving said vertical laterally movable plates toward and from each other, a tier of upper extensible rollers and a tier of lower extensible rollers mounted between said laterally movable plates, whereby said adjustable rollers can be shortened by moving the plates toward each other or permitted to be extended when the plates are moved from each other, substantially as set forth.

10. In a loaf forming machine, the combination with a main frame, of two vertical laterally movable plates in the same, means for moving said vertical laterally movable plates toward and from each other, a tier of upper extensible rollers and a tier of lower extensible rollers mounted between said laterally movable plates, the rollers of the upper tier being suspended loosely between the laterally movable plates and the rollers of the lower tier being positively mounted in the laterally movable plates, substantially as set forth.

11. In a loaf forming machine, the combination with a main frame, of two vertical laterally movable plates in the same, means for moving said vertical laterally movable plates toward and from each other, a tier of upper extensible rollers and a tier of lower extensible rollers mounted between said laterally movable plates, the rollers of the upper tier being suspended loosely between the laterally movable plates and the rollers of the lower tier being positively mounted in the laterally movable plates, endless belts from which the upper tier of rollers between said adjustable plates are mounted, substantially as set forth.

12. In a loaf forming machine, the combination with a main frame, of two vertical laterally movable plates in the same, means for moving said vertical laterally movable plates toward and from each other, a tier of upper extensible rollers and a tier of lower extensible rollers mounted between said laterally movable plates, the rollers of the upper tier being suspended loosely between the laterally movable plates and the rollers of the lower tier being positively mounted in the laterally movable plates, endless belts from which the upper tier of rollers between said adjustable plates are mounted, and means for driving said endless belts from the main shaft, substantially as set forth.

13. In a loaf forming machine provided with a lower tier of rollers and an upper tier of rollers, the rollers of the upper tier being divided into two groups each carried by a movable frame, substantially as set forth.

14. In a loaf forming machine, the combination with a fixed frame, of a lower tier of rollers mounted in the same, an upper tier of rollers divided into two groups, a movable frame for each group, means for lifting one of these frames from the other and a pair of feed rollers, substantially as set forth.

Signed at New York city in the county of New York and State of New York this 9th day of October, A. D. 1913.

WILLIAM B. BARCUS.

Witnesses:
OSCAR F. GUNZ,
PAUL H. FRANKE.

---

Copies of this patent may be obtained for five cents each, by addressing the "Commissioner of Patents, Washington, D. C."